(12) United States Patent
Wu et al.

(10) Patent No.: US 10,681,533 B2
(45) Date of Patent: Jun. 9, 2020

(54) INFORMATION WRITING METHOD AND DEVICE

(71) Applicant: Beijing Xiaomi Mobile Software Co., Ltd., Beijing (CN)

(72) Inventors: Xiaojun Wu, Beijing (CN); Feng Jin, Beijing (CN); Guilin Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/127,389

(22) Filed: Sep. 11, 2018

(65) Prior Publication Data

US 2019/0028885 A1 Jan. 24, 2019

Related U.S. Application Data

(63) Continuation of application No. PCT/CN2016/092429, filed on Jul. 29, 2016.

(51) Int. Cl.
*H04W 8/18* (2009.01)
*H04W 8/20* (2009.01)
(Continued)

(52) U.S. Cl.
CPC .......... *H04W 8/183* (2013.01); *H04W 8/205* (2013.01); *H04W 8/265* (2013.01); *H04W 12/06* (2013.01)

(58) Field of Classification Search
CPC ....... H04W 12/06; H04W 4/50; H04W 8/183; H04W 8/18; H04W 8/205; H04W 4/60; H04W 8/265
See application file for complete search history.

(56) References Cited

U.S. PATENT DOCUMENTS

| 6,799,155 B1 * | 9/2004 | Lindemann | H04W 8/183 455/558 |
| 2002/0187808 A1 * | 12/2002 | Vallstrom | H04M 1/675 455/558 |

(Continued)

FOREIGN PATENT DOCUMENTS

| CN | 1929654 A | 3/2007 |
| CN | 101557585 A | 10/2009 |

(Continued)

OTHER PUBLICATIONS

English version of International Search Report of PCT Application No. PCT/CN2016/092429, dated Apr. 24, 2017, issued by the ISA/CN—State Intellectual Property Office of the P.R. China.

(Continued)

*Primary Examiner* — Margaret G Mastrodonato
(74) *Attorney, Agent, or Firm* — Finnegan, Henderson, Farabow, Garrett & Dunner, L.L.P.

(57) ABSTRACT

An information writing method and device, the method including: acquiring code information of a Subscriber Identification Module (SIM) card, the code information being verification information used by the SIM card to access a communication network; sending the acquired code information to a Card Operating System (COS) of the SIM card via an existing interface in an operating system, the existing interface being a communication interface programmed for transmitting first information between the operating system and the COS, the first information being different from the code information; and writing, through the COS, the acquired code information into the SIM card.

18 Claims, 5 Drawing Sheets

(51) Int. Cl.
*H04W 12/06* (2009.01)
*H04W 8/26* (2009.01)

(56) References Cited

U.S. PATENT DOCUMENTS

| | | |
|---|---|---|
| 2006/0030315 A1 | 2/2006 | Smith |
| 2007/0218945 A1* | 9/2007 | Agami ................ H04W 8/183 455/558 |
| 2008/0276090 A1 | 11/2008 | Merrien |
| 2014/0031012 A1 | 1/2014 | Park |
| 2015/0163056 A1* | 6/2015 | Nix ...................... H04L 9/0869 380/46 |
| 2016/0302070 A1* | 10/2016 | Yang ...................... H04W 4/50 |
| 2017/0142121 A1* | 5/2017 | Lee .................... H04L 63/0823 |
| 2017/0155507 A1* | 6/2017 | Park ...................... H04W 8/18 |

FOREIGN PATENT DOCUMENTS

| | | | |
|---|---|---|---|
| CN | 101568098 A | * | 10/2009 |
| CN | 101568098 A | | 10/2009 |
| CN | 101771973 B | | 8/2012 |
| CN | 103037071 A | | 4/2013 |
| CN | 104507130 A | | 4/2015 |
| CN | 104796882 A | | 7/2015 |
| WO | WO 2010/015883 A1 | | 2/2010 |

OTHER PUBLICATIONS

Extended Search Report for European Application No. 17182919.5 from the European Patent Office, dated Dec. 6, 2017.
English translation of Written Opinion of the International Searching Authority of PCT Application No. PCT/CN2016/092429, dated Apr. 24, 2017.
First Office Action dated Sep. 20, 2017, in counterpart Chinese Application No. 201680000715.4 and English translation thereof.

* cited by examiner

INFORMATION WRITING METHOD AND DEVICE

CROSS-REFERENCE TO RELATED APPLICATIONS

This application is a continuation of International Application No. PCT/CN2016/092429, filed Jul. 29, 2016, the entire contents of which are incorporated herein by reference.

TECHNICAL FIELD

The present disclosure relates to the communication technology and, more particularly, to an information writing method and device.

BACKGROUND

A Subscriber Identification Module (SIM) card of a terminal is used to store code information corresponding to a communication number. When the code information passes verification of a network operator, the SIM card is allowed to access a communication network of the operator, such that a user of the terminal can use the communication number to make phone calls, send messages, etc.

Conventionally, when a terminal is used to write the code information into a SIM card, the following information writing method may be performed by the terminal. First, the terminal connects to a communication network of an operator. When it is needed to write certain code information into a SIM card of the terminal, the network operator sends the code information to an Over-the-Air-Technology (OTA) gateway. The OTA gateway converts the code information into an OTA short message and then sends the OAT short message to a short message service center. The short message service center then sends the OAT short message to the terminal. The terminal sends the OTA short message to the SIM card via a dedicated interface. Finally, the SIM card stores the code information according to the received OTA short message. The dedicated interface is an interface specially configured for the terminal to send the OTA short message to the SIM card.

SUMMARY

According to a first aspect of the present disclosure, there is provided an information writing method, comprising: acquiring code information of a Subscriber Identification Module (SIM) card, the code information being verification information used by the SIM card to access a communication network; sending the acquired code information to a Card Operating System (COS) of the SIM card via an existing interface in an operating system, the existing interface being a communication interface programmed for transmitting first information between the operating system and the COS, the first information being different from the code information; and writing, through the COS, the acquired code information into the SIM card.

According to a second aspect of the present disclosure, there is provided an information writing device, comprising: a processor; and a memory configured to store instructions executable by the processor; wherein the processor is configured to: acquire code information of a Subscriber Identification Module (SIM) card, the code information being verification information used by the SIM card to access a communication network; send the acquired code information to a Card Operating System (COS) of the SIM card via an existing interface in an operating system, the existing interface being a communication interface programmed for transmitting first information between the operating system and the COS, the first information being different from the code information; and write, through the COS, the acquired code information into the SIM card.

According to a third aspect of the present disclosure, there is provided a non-transitory computer-readable storage medium storing instructions that, when executed by a processor, cause the processor to perform an information writing method, the method comprising: acquiring code information of a Subscriber Identification Module (SIM) card, the code information being verification information used by the SIM card to access a communication network; sending the acquired code information to a Card Operating System (COS) of the SIM card via an existing interface in an operating system, the existing interface being a communication interface programmed for transmitting first information between the operating system and the COS, the first information being different from the code information; and writing, through the COS, the acquired code information into the SIM card.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the specification, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as recited in the appended claims.

Figure 1:
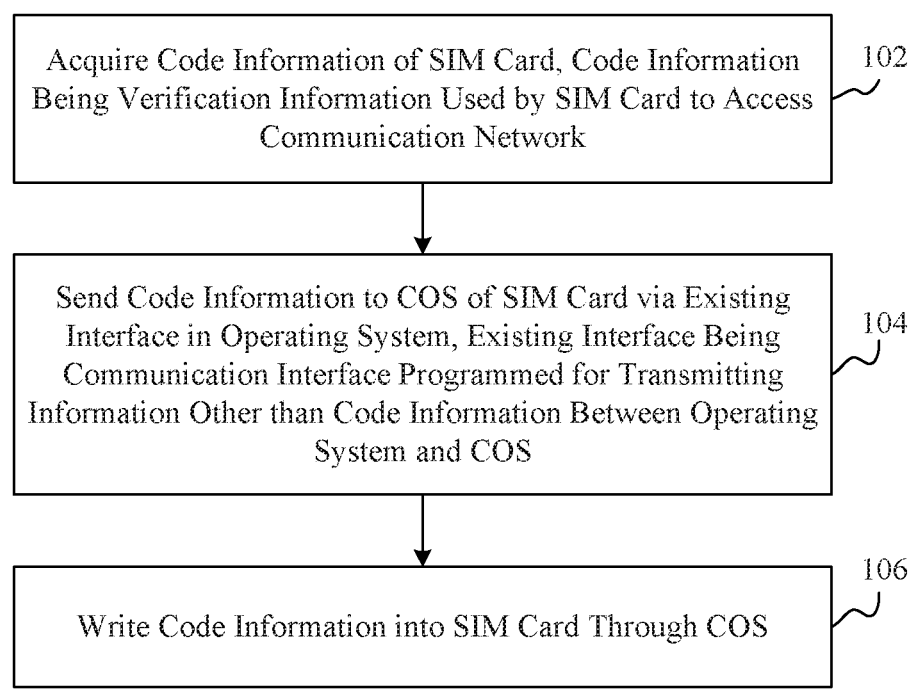
FIG. 1 is a flowchart of an information-writing method, according to an exemplary embodiment.

FIG. 1 is a flowchart of an information writing method 100, according to an exemplary embodiment. Consistent with the disclosed embodiments, the information writing method 100 may be performed by a terminal. Referring to FIG. 1, the information writing method 100 includes the following steps 102-106.

In step 102, the terminal acquires code information of a Subscriber Identification Module (SIM) card. The code information is verification information used by the SIM card to access a communication network.

In step 104, the terminal sends the code information to a Card Operating System (COS) of the SIM card via an existing interface in an operating system of the terminal. The existing interface is a communication interface programmed for transmitting information other than the code information between the operating system and the COS.

In step 106, the terminal writes, through the COS, the code information into the SIM card.

According to the information writing method 100, the code information of a SIM card can be transmitted via an existing interface in a terminal's operating system. This way, the information writing method 100 not only simplifies the process of transmitting the code information, but also solves the problem that, when a network operator limits the terminal's ability to receive OTA short messages, the terminal is unable to write the code information into the SIM card. As such, the success rate of writing the code information into the SIM card can be improved.

Figure 2:
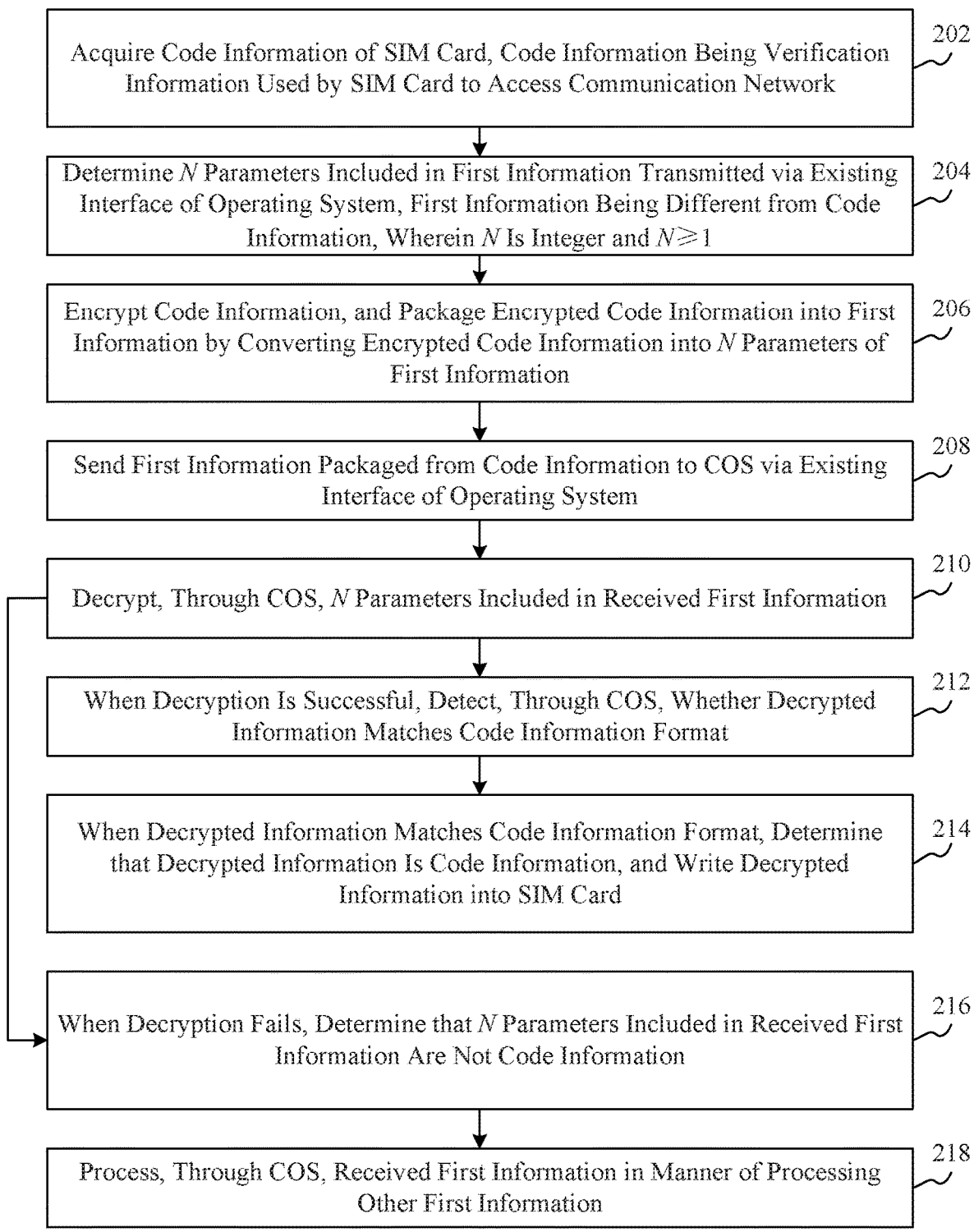
FIG. 2 is a flowchart of an information-writing method, according to an exemplary embodiment.

FIG. 2 is a flowchart of an information-writing method 200, according to an exemplary embodiment. Consistent with the disclosed embodiments, the information-writing method 200 may be performed by a terminal. Referring to FIG. 2, the information-writing method 200 includes the following steps.

In step 202, the terminal acquires code information of a SIM card. The code information is verification information used by the SIM card to access a network.

Specifically, the acquiring of the code information may include the steps of: accessing a data network; and acquiring the code information from the data network. The data network is a network accessible by the terminal without using a SIM card. The data network may be a wired or wireless network, which is not limited by the present disclosure. In one embodiment, the data network may be a Wireless-Fidelity (WiFi) network.

As used in the present disclosure, the SIM card refers to any card in the terminal that can be used for storing the code information. The code information refers to the verification information used by the SIM card to access a communication network. In the disclosed embodiments, the code information may include information such as an International Mobile Subscriber Identification (IMSI) number, a Key Identifier (KI), an Original Point Code (OPC), or a short message center number. When the code information of the SIM card passes verification by an operator of a communication network, the terminal can access the communication network through the SIM card, and a user of the terminal can use a communication number corresponding to the code information. For example, if the communication number corresponding to the code information in the SIM card is "150xxxxxxxx," the user may use the communication number to send a short message and/or making a call after the terminal is connected to the communication network.

As described above, the data network from which the terminal may acquire the code information is a network accessible by the terminal without using a SIM card. As such, even if the terminal cannot use the SIM card to access a local communication network, for example, when the user of the terminal travels in a foreign country, the terminal can still acquire the code information through the data network. This way, the user does not need to purchase a roaming communication number specially used for the SIM card to access a local communication network. Therefore, the cost of using the SIM card may be reduced.

After the terminal acquires the code information, the terminal needs to send the acquired code information to a COS of the SIM card. The COS is an operating system of the SIM card. In some embodiments, the terminal may send the code information to the COS immediately after acquiring the code information. That is, the terminal can send the code information to the COS once the terminal has a network connection. In some embodiments, the terminal may send the code information to the COS when the terminal is offline. The present disclosure does not limit the timing and manner in which the terminal sends the code information to the COS.

In step 204, the terminal determines n parameters included in first information transmitted via an existing interface in an operating system of the terminal, wherein n is an integer and n≥1. The first information is different from the code information of the SIM card.

In the disclosed embodiments, the terminal selects, from the operating system of the terminal, an existing interface capable of communicating with the COS. The existing interface is a communication interface programmed for transmitting the first information between the operating system and the COS. That is, the first information is information transmitted via the existing interface when original functions of the existing interface are implemented. For example, when the existing interface is a read-write interface for an SIM card short message, the original function of the existing interface is to read and write a SIM card short message, and the first information is the short message. As another example, when the existing interface is a read-write interface for contact information of contact persons, the original function of the existing interface is to read and write contact information, and the first information is contact information.

Depending on the operating system of the terminal, the terminal may select different existing interfaces. For example, when the operating system is an Android™ system whose version number is below 5.0, the existing communication interfaces between the operating system and the COS include read-write interfaces for SIM card short messages and/or contact information. Accordingly, the terminal may select one of the two communication interfaces as the existing interface for purpose of implementing the method 200. As another example, when the operating system is an Android™ system whose version number is above 5.0, the existing communication interface between the operating system and the COS may be an Integrated Circuit Card (ICC) interface. Accordingly, the terminal may use the ICC interface as the existing interface for purpose of implementing the method 200. As yet another example, when the operating system is a MediaTek™ (MTK) system, the existing communication interface between the MTK system and the COS is a universal interface.

Since the existing interface is configured to transmit the first information, which is different from the code information, the terminal is required to package the code information into the first information, to ensure that the code information transmitted via the existing interface can be received by the COS. If, however, the code information is not packaged into the first information, the code information cannot be identified by the COS and thus will be discarded by the COS. In the disclosed embodiments, the number and format of the parameters in the first information are usually fixed. As such, the terminal may package the code information into the parameters in the first information. In this manner, a program developer is not required to modify the existing interface to transmit the code information. Thus, the disclosed method avoids the complexity of modifying an existing interface, and simplifies the process of transmitting the code information.

In the disclosed embodiments, different existing interfaces are used for transmitting different types of first information. Thus, different existing interfaces correspond to different parameters. For example, parameters used by a read-write interface for contact information include a phone parameter and a name parameter.

In step 206, the terminal encrypts the code information, and packages the encrypted code information into the first information by converting the encrypted code information to the n parameters of the first information.

After the code information is packaged into the first information, the COS cannot tell whether the received first information is "real first information" (i.e., first information not packaged from the code information) or first information packaged from the code information. Thus, the terminal needs to have a mechanism for distinguishing the real first information from the first information packaged from the code information.

In exemplary embodiments, the terminal packages the encrypted code information into the first information. As such, an encryption key is stored in the terminal, and a decryption key is stored in the COS. In various embodiments, the encryption key and the decryption key may be a pair of public and private keys, or may be a pair of symmetric keys. The present disclosure does not limit the specific manner of performing encryption/decryption or the specific form of encryption/decryption keys.

The following description will assume the code information has m parameters, wherein m is an integer and m≥1. In order to package the code information into the first information, the terminal needs to convert the m parameters of the code information into the n parameters of the first information. Depending on the relationship between m and n, the terminal performs the conversion differently.

When m<n, the terminal encrypts the m parameters included in the code information to obtain m encrypted parameters respectively, selects m parameters from the n parameters included in the first information, sets the m encrypted parameters of the code information as the m selected parameters of the first information, and sets the remaining (n−m) parameters of the first information to be preset values. Alternatively, the terminal may select (n−m) parameters from the m encrypted parameters of the code information, and set the selected (n−m) encrypted parameters as the remaining (n−m) parameters of the first information. For example, when the code information includes an IMSI number while the parameters of the first information include a phone parameter and a name parameter, the terminal encrypts the IMSI number, sets the encrypted IMSI number as the phone parameter of the first information, and sets the name parameter of the first information to be a preset value. Alternatively, the terminal may set the encrypted IMSI number as the name parameter of the first information.

When m=n, the terminal encrypts the m parameters of the code information to obtain m encrypted parameters respectively, and sets the m encrypted parameters of the code information as the n parameters of the first information. For example, if the code information includes an IMSI number and a KI, while the parameters of the first information include a phone parameter and a name parameter, the terminal encrypts the IMSI number and the KI, sets the encrypted IMSI number as the phone parameter, and sets the encrypted KI as the name parameter.

When m>n, the terminal divides the m parameters included in the code information into n categories, encrypts the n categories to obtain n encrypted parameters of the code information, and sets the n encrypted parameters of the code information as the n parameters of the first information. For example, if the code information includes an IMSI number, a KI, and a short message service center number, while the parameters of the first information include the phone parameter and the name parameter, the terminal may put the IMSI number and the KI into a first category, put the short message service center number into a second category, encrypt the IMSI number and the KI to generate the phone parameter of the first information, and encrypt the short message service center number to generate the name parameter of the first information.

In step 208, the terminal sends the first information packaged from the code information to the COS via the existing interface in the operating system.

In step 210, the terminal decrypts, through the COS, the n parameters included in first information received via the existing interface.

After the COS receives the first information via the existing interface, the COS uses the decryption key to decrypt the received first information. As shown in FIG. 2, if the decryption by the COS is successful, step 212 is executed. But if the decryption by the COS fails, step 216 is executed.

In step 212, if the decryption is successful, the terminal detects, through the COS, whether the decrypted information matches a code information format.

The code information format refers to the format of the code information before the code information is encrypted. Since the code information includes multiple parameters, an expression may be set for each parameter and the expressions of all the parameters in combination constitute the code information format. In the present disclosure, the expressions of the parameters do not include the parameter values.

For example, the code information format may be "IMSI=xxx&KI=xxx&OPC=xxx." Alternatively, the code information format may be a JSON object, e.g., {{"ki": "xxx", "opc":"xxxx"}}. The present disclosure does not limit how the code information format is set.

In exemplary embodiments, the terminal detects, through the COS, whether the expression of each parameter in the decrypted information is the same as the expression of the parameter in the code information format. When the expression of each parameter in the decrypted information is the same as the expression of the parameter in the code information format, the terminal determines that the decrypted information matches the code information format. When the expression of a parameter in the decrypted information is different from the expression of the parameter in the code information format, the terminal determines that the decrypted information does not match the code information format.

In some embodiments, the sequence of the expressions of the parameters in the decrypted information may be different from the sequence of the expressions of the parameters in the code information format. That is, the detection of whether the decrypted information matches the code information format does not require the sequence of the expressions of the parameters in the decrypted information to be the same as the sequence of the expressions of the parameters in the code information format.

In step 214, when it is detected that the decrypted information matches the code information format, the terminal determines that the decrypted information is the code information, and writes, through the COS, the decrypted information into the SIM card.

Specifically, when the decrypted information matches the code information format, the COS determines that the received first information is first information packaged from the code information, and therefore the decrypted information is the code information. The COS then writes the decrypted information, as the code information, into the SIM card.

In step 216, when the decryption fails, the terminal determines that the n parameters included in the received first information are not the code information.

Specifically, when the decryption fails, or when the decrypted information does not match the code information format, the COS determines that the received first information is the real first information, not the first information packaged from the code information.

In step 218, the terminal processes, through the COS, the received first information in the manner of processing first information.

For example, when the phone parameter is "138xxxxxxxx" and the name parameter is "John Doe," the COS creates contact information in the SIM card, and writes "138xxxxxxxx" and "John Doe" into the SIM card as part of the contact information.

In some embodiments, the SIM card may be pre-stored with code information. Accordingly, the terminal may update the pre-stored code information in the SIM card using the newly acquired code information. For example, if the SIM card has pre-stored code information and the pre-stored code information passes verification of the network of the operator, a user can use a communication number corresponding to the pre-stored code information to communicate with other people. When the user travels out of the service area of the communication number corresponding to the pre-stored code information, e.g., travelling to a foreign country, the user may need to use a local communication number to save the communication cost. As such, the COS may update the pre-stored code information using code information corresponding to the local communication number. When the code information corresponding to the local communication number passes verification of the operator of the local communication network, the user may use the local communication number for communication.

In some embodiments, the SIM card has no pre-stored code information. That is, the SIM card is a blank card. Accordingly, the terminal may write, through the COS, the newly acquired code information directly into the SIM card. In this manner, a user may obtain a blank SIM card and use the terminal to write suitable code information into the SIM card according to the user's need, such that the usage area of the SIM card can be widened.

According to the information writing method 200, the code information is sent to the COS of the SIM card via an existing interface in the operating system, and then the code information is written into the SIM card through the COS. This way, the information writing method 200 not only simplifies the process of transmitting the code information, but also solves the problem that, when a network operator limits the terminal's ability to receive OTA short messages, the terminal is unable to write the code information into the SIM card. As such, the success rate of writing the code information into the SIM card can be improved.

Moreover, the information writing method 200 acquires the code information of the SIM card from a data network, without the need of acquiring the code information from a communication network. This way, the method 200 solves the problem that the terminal cannot acquire the code information from a communication network when the SIM card cannot access the communication network, e.g., when the user travels in a foreign country. As such, the success rate of acquiring code information is increased.

Moreover, the information writing method 200 determines the parameters in the first information transmitted via the existing interface in the operating system, encrypts the code information, packages the encrypted code information into the first information by converting the encrypted code information into the parameters in the first information, and sends the first information packaged from the encrypted first information to the COS via the existing interface. This way, the code information is packaged into the first information for transmission, without the need of modifying the existing interface. As such, the method 200 avoids the complexity in modifying the existing interface, and thus reduces the complexity in transmitting the code information to the SIM card.

Moreover, according to the information writing method 200, when there is no pre-stored code information in the SIM card, the terminal writes, through the COS, the code information directly into the SIM card. This way, the user can obtain a blank SIM card and write suitable code information into the blank card according to the user's particular need. As such, the usage area of the SIM card is widened.

Moreover, by sending the code information to the COS of the SIM card via the existing interface that is originally designed for transmitting information other than the code information, the information writing method 200 expand the function of the existing interface.

Figure 3:
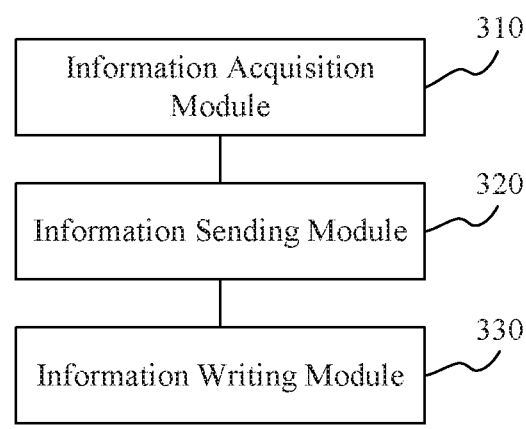
FIG. 3 is a block diagram of an information-writing device, according to an exemplary embodiment.

FIG. 3 is a block diagram of an information-writing device 300, according to an exemplary embodiment. Consistent with the disclosed embodiments, the information-writing device 300 may be implemented as the whole or a part of a terminal. Referring to FIG. 3, the information-writing device 300 includes an information acquisition module 310, an information sending module 320, and an information writing module 330.

The information acquisition module 310 is configured to acquire code information of a SIM card. The code information is verification information used by the SIM card to access a communication network.

The information sending module 320 is configured to send the code information acquired by the information acquisition module 310 to a COS of the SIM card, through an existing interface in an operating system. The existing interface is a communication interface programmed for transmitting first information between the operating system and the COS. The first information is different from the code information of the SIM card.

The information-writing module 330 is configured to write, through the COS, the code information sent by the information sending module 320 into the SIM card.

The information writing device 300 not only simplifies the process of transmitting the code information, but also solves the problem that, when a network operator limits the terminal's ability to receive OTA short messages, the terminal is unable to write the code information into the SIM card. As such, the success rate of writing the code information into the SIM card can be improved.

Figure 4:
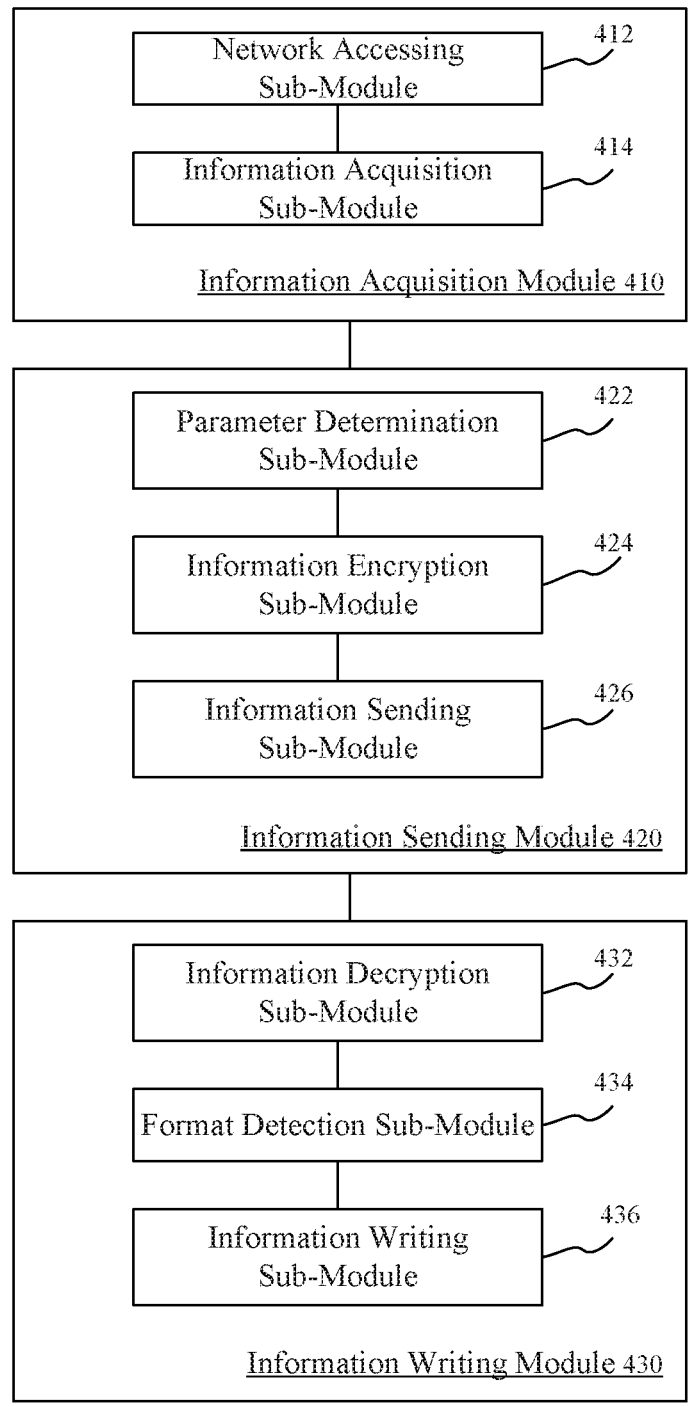
FIG. 4 is a block diagram of an information-writing device, according to an exemplary embodiment.

FIG. 4 is a block diagram of an information writing device 400, according to an exemplary embodiment. For example, the information writing device 400 may be implemented as the whole of a part of a terminal. As shown in FIG. 4, the information writing device 400 includes an information acquisition module 410, an information sending module 420, and an information writing module 430, similar to the information acquisition module 310, the information sending module 320, and the information writing module 330 (FIG. 3), respectively.

In some embodiments, the information sending module 420 further includes a parameter determination sub-module 422, an information encryption sub-module 424, and an information sending sub-module 426.

The parameter determination sub-module 422 is configured to determine one or more parameters included in the first information transmitted via the existing interface.

The information encryption sub-module 424 is configured to encrypt the code information acquired by the information acquisition module 410, and package the encrypted code information into the first information by converting the encrypted code information into the one or more parameters of the first information.

The information sending sub-module 426 is configured to send the first information packaged from the encrypted code information to the COS via the existing interface in the operating system.

In some embodiments, the information writing module 430 further includes an information decryption sub-module 432, a format detection sub-module 434, and an information writing sub-module 436

The information decryption sub-module 432 is configured to decrypt, through the COS, one or more parameters included in the first information received via the existing interface.

The format detection sub-module 434 is configured to detect, through the COS, whether the decrypted information matches a code information format, when the decryption by the information decryption sub-module 432 is successful.

The information writing sub-module 436 is configured to determine, through the COS, that the decrypted information is the code information, and write, through the COS, the decrypted information into the SIM card, when the decrypted information matches the code information format.

In some embodiments, the information acquisition module 410 further includes a network accessing sub-module 412 and an information processing module 414

The network accessing sub-module 412 is configured to access a data network.

The information acquisition sub-module 414 is configured to acquire the code information of the SIM card from the accessed data network.

In some embodiments, the information writing module 430 is further configured to: when there is pre-stored code information in the SIM card, update, through the COS, the pre-stored code information in the SIM card using the received code information; and when there is no pre-stored code information in the SIM card, directly write, through the COS, the code information into the SIM card.

With respect to the devices in the above embodiments, the specific manners for performing operations for individual modules therein have been described in detail in the embodiments regarding the methods, which will not be elaborated herein.

Figure 5:
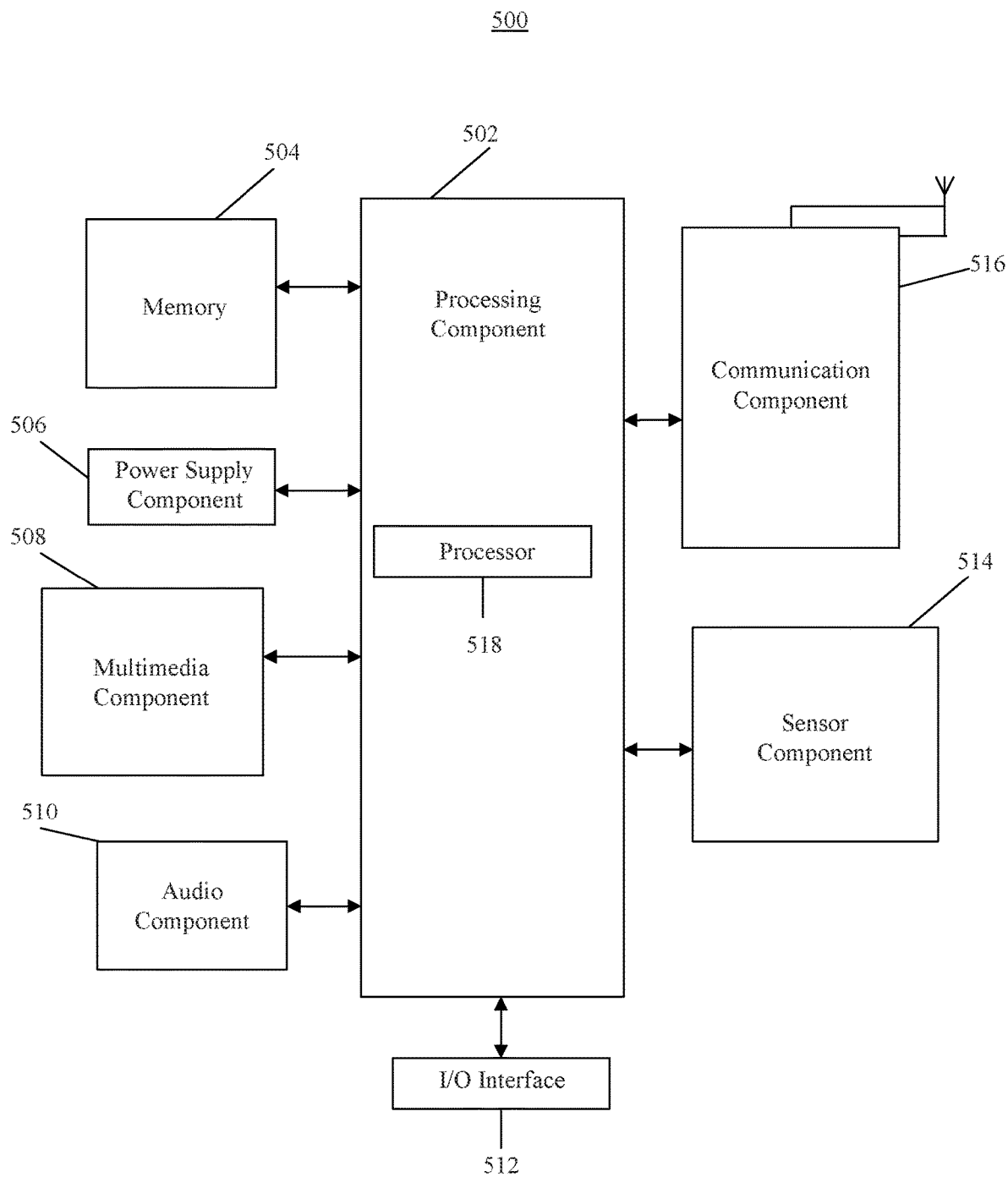
FIG. 5 is a block diagram of an information-writing device, according to an exemplary embodiment.

FIG. 5 is a block diagram of an information writing device 500, according to an exemplary embodiment. For example, the device 500 may be a mobile phone, a computer, a digital broadcast terminal, a messaging device, a gaming console, a tablet, a medical device, exercise equipment, a personal digital assistant, and the like.

Referring to FIG. 5, the device 500 may include one or more of the following components: a processing component 502, a memory 504, a power supply component 506, a multimedia component 508, an audio component 510, an Input/Output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 518 to execute instructions to perform all or some of the steps in the abovementioned methods. Moreover, the processing component 502 may include one or more modules which facilitate interaction between the processing component 502 and the other components. For instance, the processing component 502 may include a multimedia module to facilitate interaction between the multimedia component 508 and the processing component 502.

The memory 504 is configured to store various types of data to support the operation of the device 500. Examples of such data include instructions for any application programs or methods operated on the device 500, contact data, phonebook data, messages, pictures, video, etc. The memory 504 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power supply component 506 provides power for various components of the device 500. The power supply component 506 may include a power management system, one or more power supplies, and other components associated with the generation, management and distribution of power for the device 500.

The multimedia component 508 includes a screen providing an output interface between the device 500 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 508 includes a front camera and/or a rear camera. The front camera and/or the rear camera may receive external multimedia data when the device 500 is in an operation mode, such as a photographing mode or a video mode. Each of the front camera and the rear camera may be a fixed optical lens system or have focusing and optical zooming capabilities.

The audio component 510 is configured to output and/or input an audio signal. For example, the audio component 510 includes a microphone, and the microphone is configured to receive an external audio signal when the device 500 is in the operation mode, such as a call mode, a recording mode, or a voice recognition mode. The received audio signal may be further stored in the memory 504 or sent through the communication component 516. In some embodiments, the audio component 510 further includes a speaker configured to output the audio signal.

The I/O interface 512 provides an interface between the processing component 502 and a peripheral interface module, and the peripheral interface module may be a keyboard, a click wheel, a button and the like. The button may include, but not limited to: a home button, a volume button, a starting button, and a locking button.

The sensor component 514 includes one or more sensors configured to provide status assessment in various aspects for the device 500. For instance, the sensor component 514 may detect an on/off status of the device 500 and relative positioning of components, such as a display and small keyboard of the device 500, and the sensor component 514 may further detect a change in a position of the device 500 or a component of the device 500, presence or absence of contact between the user and the device 500, orientation or acceleration/deceleration of the device 500, and a change in temperature of the device 500. The sensor component 514 may include a proximity sensor configured to detect presence of an object nearby without any physical contact. The sensor component 514 may also include a light sensor, such as a Complementary Metal Oxide Semiconductor (CMOS) or Charge Coupled Device (CCD) image sensor, configured for use in an imaging application. In some embodiments, the sensor component 514 may also include an acceleration sensor, a gyroscope sensor, a magnetic sensor, a pressure sensor, or a temperature sensor.

The communication component 516 is configured to facilitate wired or wireless communication between the device 500 and another device. The device 500 may access a communication-standard-based wireless network, such as a WiFi network, a 2nd-Generation (2G) network, a 3rd-Generation (3G) network, 4th-Generation (4G) network, or a combination thereof. In an exemplary embodiment, the communication component 516 receives a broadcast signal or broadcast associated information from an external broadcast management system through a broadcast channel In an exemplary embodiment, the communication component 516 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideB and (UWB) technology, a BlueTooth® (BT) technology, or another technology.

In an exemplary embodiment, the device 500 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including an instruction, such as the memory 504 including an instruction, and the instruction may be executed by the processor 518 of the device 500 to implement the abovementioned methods. For example, the non-transitory computer-readable storage medium may be a ROM, a Radom Access Memory (RAM), a Compact Disc Read-Only Memory (CD-ROM), a magnetic tape, a floppy disc, an optical data storage device, and the like.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. An information writing method for a terminal, comprising:
   acquiring, by the terminal, code information of a Subscriber Identification Module (SIM) card, the code information being verification information used by the SIM card to access a communication network;
   determining one or more parameters included in a first type of information to be transmitted via an existing interface between an operating system of the terminal and a Card Operating System (COS) of the SIM card;
   encrypting, by the terminal, the acquired code information by an encryption key stored in the terminal;
   packaging the encrypted code information into the first type of information by converting the encrypted code information into the one or more parameters of the first type of information;
   sending the acquired code information, in a form of the packaged encrypted code information, to the COS of the SIM card via the existing interface in the operating system of the terminal; and
   writing, through the COS, the acquired code information into the SIM card.

2. The method according to claim 1, wherein writing, through the COS, the acquired code information into the SIM card comprises:
   decrypting, through the COS, one or more parameters included in the packaged encrypted code information received via the existing interface in the operating system;
   when the decrypting is successful, detecting, through the COS, whether the decrypted one or more parameters match a code information format; and
   when the decrypted one or more parameters match the code information format, determining that the decrypted one or more parameters are the acquired code information, and writing, through the COS, the decrypted one or more parameters into the SIM card.

3. The method according to claim 1, wherein acquiring the code information of the SIM card comprises:
   accessing a data network; and
   acquiring the code information of the SIM card from the accessed data network.

4. The method according to claim 1, wherein writing, through the COS, the acquired code information into the SIM card comprises:
   when there is pre-stored code information in the SIM card, updating, through the COS, the pre-stored code information in the SIM card using the acquired code information; and
   when there is no pre-stored code information in the SIM card, writing, through the COS, the code information into the SIM card.

5. The method according to claim 1, wherein writing, through the COS, the acquired code information into the SIM card comprises:

when there is pre-stored code information in the SIM card, updating, through the COS, the pre-stored code information in the SIM card using the acquired code information; and when there is no pre-stored code information in the SIM card, writing, through the COS, the code information into the SIM card.

6. The method according to claim 2, wherein writing, through the COS, the acquired code information into the SIM card comprises:

when there is pre-stored code information in the SIM card, updating, through the COS, the pre-stored code information in the SIM card using the acquired code information; and when there is no pre-stored code information in the SIM card, writing, through the COS, the code information into the SIM card.

7. The method according to claim 3, wherein writing, through the COS, the acquired code information into the SIM card comprises:

when there is pre-stored code information in the SIM card, updating, through the COS, the pre-stored code information in the SIM card using the acquired code information; and when there is no pre-stored code information in the SIM card, writing, through the COS, the code information into the SIM card.

8. The method according to claim 1, wherein when the original function of the existing interface is to read and write a short message, the first type of information is the short message; when the original function of the existing interface is to read and write contact information, the first type of information is contact information.

9. An information writing device in a terminal, comprising:
a processor; and
a memory configured to store instructions executable by the processor;
wherein the processor is configured to:
acquire code information of a Subscriber Identification Module (SIM) card, the code information being verification information used by the SIM card to access a communication network;
determine one or more parameters included in a first type of information to be transmitted via an existing interface between an operating system of the terminal and a Card Operating System (COS) of the SIM card;
encrypt the acquired code information by an encryption key stored in the terminal;
package the encrypted code information into the first type of information by converting the encrypted code information into the one or more parameters of the first type of information;
send the acquired code information, in a form of the packaged encrypted code information, to the COS of the SIM card via the existing interface in the operating system of the terminal; and
write, through the COS, the acquired code information into the SIM card.

10. The device according to claim 9, wherein in writing, through the COS, the acquired code information into the SIM card, the processor is further configured to:
decrypt, through the COS, one or more parameters included in the packaged encrypted code information received via the existing interface in the operating system;

when the decrypting is successful, detect, through the COS, whether the decrypted one or more parameters match a code information format; and when the decrypted one or more parameters match the code information format, determine that the decrypted one or more parameters are the acquired code information, and writing, through the COS, the decrypted one or more parameters into the SIM card.

11. The device according to claim 9, wherein in acquiring the code information of the SIM card, the processor is further configured to:
access a data network; and
acquire the code information of the SIM card from the accessed data network.

12. The device according to claim 9, wherein in writing, through the COS, the acquired code information into the SIM card, the processor is further configured to:
when there is pre-stored code information in the SIM card, update, through the COS, the pre-stored code information in the SIM card using the acquired code information; and
when there is no pre-stored code information in the SIM card, write, through the COS, the code information into the SIM card.

13. The method according to claim 9, wherein in writing, through the COS, the acquired code information into the SIM card, the processor is further configured to:
when there is pre-stored code information in the SIM card, update, through the COS, the pre-stored code information in the SIM card using the acquired code information; and
when there is no pre-stored code information in the SIM card, write, through the COS, the code information into the SIM card.

14. The device according to claim 10, wherein in writing, through the COS, the acquired code information into the SIM card, the processor is further configured to:
when there is pre-stored code information in the SIM card, update, through the COS, the pre-stored code information in the SIM card using the acquired code information; and
when there is no pre-stored code information in the SIM card, write, through the COS, the code information into the SIM card.

15. A non-transitory computer-readable storage medium storing instructions that, when executed by a processor in a terminal, cause the terminal to perform an information writing method, the method comprising:
acquiring code information of a Subscriber Identification Module (SIM) card, the code information being verification information used by the SIM card to access a communication network;
determining one or more parameters included in a first type of information to be transmitted via an existing interface between an operating system of the terminal and a Card Operating System (COS) of the SIM card;
encrypting, by the terminal, the acquired code information by an encryption key stored in the terminal;
packaging the encrypted code information into the first type of information by converting the encrypted code information into the one or more parameters of the first type of information;
sending the acquired code information, in a form of the packaged encrypted code information, to the COS of the SIM card via the existing interface in the operating system of the terminal; and writing, through the COS, the acquired code information into the SIM card.

16. The non-transitory computer-readable storage medium according to claim 15, wherein writing, through the COS, the acquired code information into the SIM card comprises:
- decrypting, through the COS, one or more parameters included in the packaged encrypted code information received via the existing interface in the operating system;
- when the decrypting is successful, detecting, through the COS, whether the decrypted one or more parameters match a code information format; and
- when the decrypted one or more parameters match the code information format, determining that the decrypted one or more parameters are the acquired code information, and writing, through the COS, the decrypted one or more parameters into the SIM card.

17. The non-transitory computer-readable storage medium according to claim 15, wherein acquiring the code information of the SIM card comprises:
- accessing a data network; and
- acquiring the code information of the SIM card from the accessed data network.

18. The non-transitory computer-readable storage medium according to claim 15, wherein writing, through the COS, the acquired code information into the SIM card comprises:
- when there is pre-stored code information in the SIM card, updating, through the COS, the pre-stored code information in the SIM card using the acquired code information; and
- when there is no pre-stored code information in the SIM card, writing, through the COS, the code information into the SIM card.

* * * * *